Figure 1:
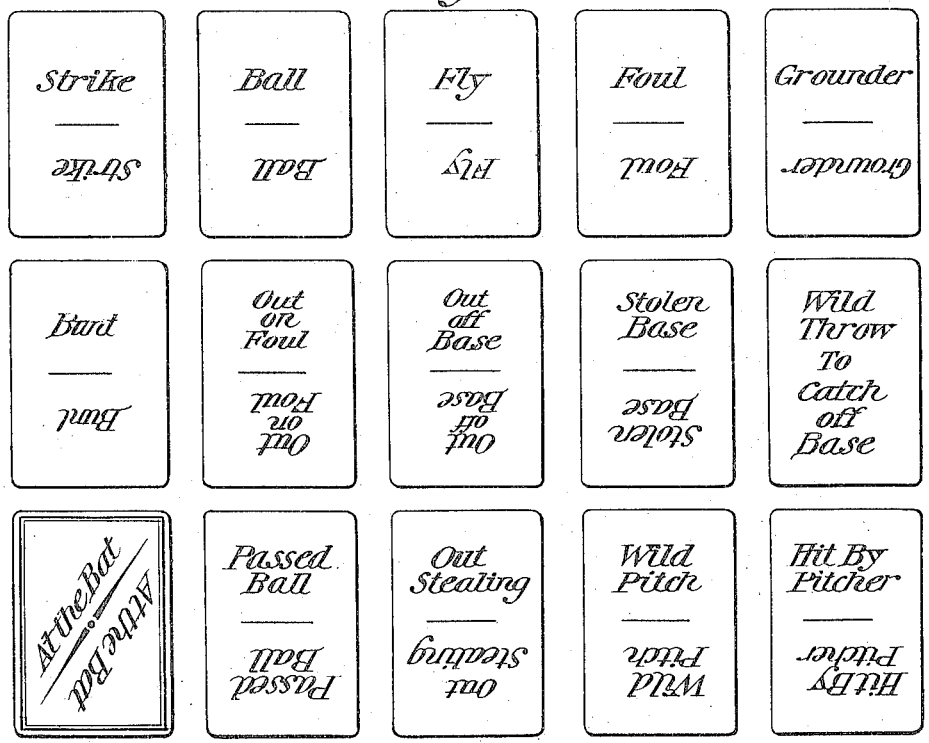

J. H. McCLELLAND.
BASE BALL GAME.
APPLICATION FILED JAN. 21, 1916.
1,208,594.
Patented Dec. 12, 1916.
2 SHEETS—SHEET 2.
Fig. 2.
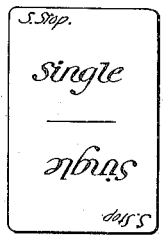 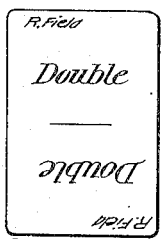 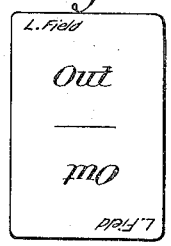 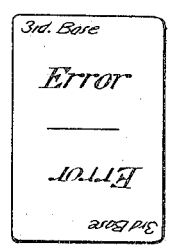 
Fig. 4.        Fig. 5.
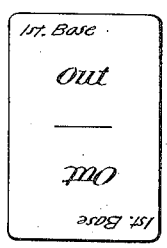 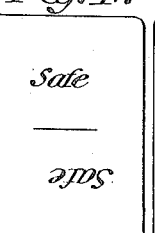  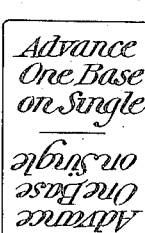 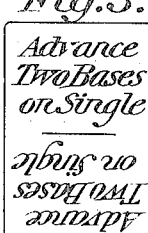 
Fig. 6.
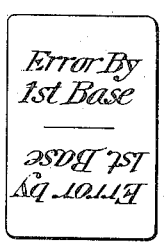 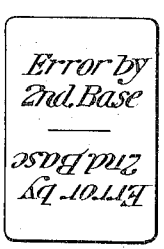 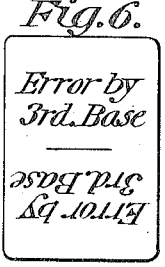 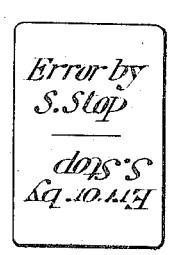 
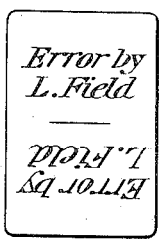 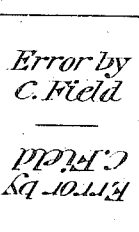 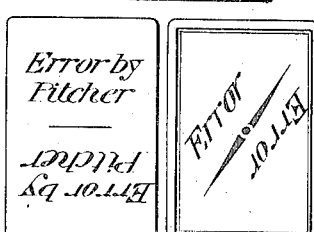
Fig. 7.
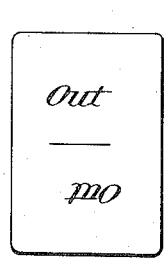 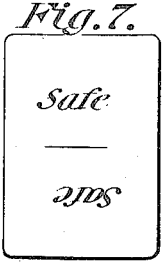 
Inventor
J. H. McClelland
Witnesses
By Victor J. Evans
Attorney

UNITED STATES PATENT OFFICE.

JOHN H. McCLELLAND, OF ANAMOOSE, NORTH DAKOTA.

BASE-BALL GAME.

1,208,594.

Specification of Letters Patent.

Patented Dec. 12, 1916.

Application filed January 21, 1916. Serial No. 73,458.

*To all whom it may concern:*

Be it known that I, JOHN H. McCLEL-LAND, a citizen of the United States, residing at Anamoose, in the county of McHenry and State of North Dakota, have invented new and useful Improvements in Base-Ball Games, of which the following is a specification.

This invention contemplates the provision of a game, wherein use is made of a number of decks of cards, each having certain indicia thereon to permit of the playing of the national game of base ball.

More specifically stated the invention embodies a plurality of decks of cards, each deck being subdivided into a plurality of suits bearing different indicia indicative of various plays in the game desired to be played, certain cards of one deck having their value determined by the cards of certain decks, which together with the cards of the other decks govern the advancement of the player or players in the scoring of the game.

The nature and manner of playing the game will be hereinafter more fully set forth, and better understood when the description is read in connection with the accompanying drawings, wherein like numerals of reference indicate similar parts in the several views and in which :—

Figure 1 is a view showing one card of each of a plurality of suits which go to make up what is to be hereinafter known as the "at the bat" deck, and an additional card face downward. Fig. 2 is a similar view of the cards which constitutes what is to be hereinafter known as the "grounder" deck also showing one of the cards face downward. Fig. 3 is a similar view of the cards which go to make up what is to be hereinafter known as the "fly" deck one of these cards also being shown face downward. Fig. 4 is a similar view showing the cards used in the deck to be hereinafter known as the "bunt" deck one of these cards being also shown face downward. Fig. 5 is a similar view of the cards used in the deck to be hereinafter known as the "advance" deck, one of these cards being shown face downward. Fig. 6 is a similar view showing the cards used in what is to be hereinafter known as the "error" deck, one of these cards being shown face downward. Fig. 7 is a similar view of the cards used in what is to be hereinafter known as the "double play" deck, one of these cards also being shown face downward.

The size and contour of each and all the cards correspond to the ordinary playing cards, and it might here be stated that the number of cards in the respective decks may be varied. However the game consists of seven distinct decks of cards, each deck being distinguished from the remaining decks by the design on the back of the cards of each deck, which may be varied in any suitable manner, as shown in the different figures of the drawing by the card A arranged face downward. There is one large deck to be known as the "at the bat" deck, two medium sized decks to be known as the "grounder" deck and "fly" deck shown in Figs. 2 and 3 respectively, and four relatively small decks to be known as the "bunt", "advance", "error" and "double play" decks respectively indicated in Figs. 4, 5, 6 and 7.

The "at the bat" deck preferably consists of seventy-seven cards which are divided into nine suits, namely, two suits of eighteen cards each, one suit bearing the word "Strike" and the other suit bearing the word "Ball"; two suits of eight cards each, one bearing the word "Fly" and the other bearing the word "Foul"; two suits of five cards each, one bearing the word "Grounder" and the other bearing the word "Bunt"; two suits of three cards each, one bearing the expression "Out on foul" and the other bearing the expression "Out off base"; one suit of four cards, each bearing the expression "Stolen base"; and five additional cards each of which bear a different expression such as "Wild throw to catch off base," "Passed ball," "Out stealing," "Wild pitch," and "Hit by pitcher."

The " grounder " deck preferably consists of twenty-nine cards divided into three suits, namely a suit of seven cards each bearing the word " Single," a suit of two cards each bearing the word " Double," a suit of nineteen cards each bearing the word " Out," and an additional card bearing the word " Error."

The " fly " deck is subdivided into four suits, namely, a suit of nineteen cards each bearing the word " Out," a suit of five cards, each bearing the word " Single," two suits of two cards each, one suit bearing the word " Double," and the cards of the other suit bearing the word "Triple," and two additional cards, one bearing the word "Error" and the other the words "Home run."

The "bunt" deck is subdivided into a suit of five cards each bearing the word "Out" and an additional card bearing the word "Safe."

The deck known as the "advance" deck is divided into two suits, a suit of six cards, each bearing the expression "Advance one base on single," and a suit of two cards, each bearing the expression "Advance two bases on single." It is to be understood however, that the cards bearing the expression "Advance one base on single" also means that the runner would advance two bases on a double, should one of these cards be drawn from the "advance" deck when the batter is credited with a two base hit. Similarly the cards with the expression "Advance two bases on a single," means that the runner would advance three bases on a double should one of these cards be drawn with a man on base, subsequent to the selection of a card from the "grounder" deck, crediting the batter with a two base hit.

The deck to be known as the "double play" deck is preferably divided into two suits, one suit of three cards each bearing the word "Safe," and a suit of nine cards each bearing the word "Out."

As hereinabove stated the number of cards in each deck or suit may be varied if desired, and that all the cards of the respective decks, with the exception of the "at the bat," "double play" and "advance" decks, contain in addition to the indicia set forth, indicia indicative of the different players and their respective positions.

Prior to the playing of the game it is of course to be decided by the players which one will take the first turn at the bat, and after this has been decided each of the seven decks of cards are shuffled and arranged face downward in front of the player. The cards are drawn singly from the top of the "at the bat" deck to determine the accomplishment of the supposed batter, for instance if the player should draw a "strike" card it is arranged face upward on the table and a second card drawn from the pack. If the second card so drawn is a "ball" card, it also is turned face upward on the table in front of the player. The cards are thus drawn singly from the "at the bat" deck until the supposed batter is disposed of by the opposition in one way or the other, it of course being understood that should three "strike" cards be drawn prior to the selection of four cards known as "ball" cards, the batter is of course declared out. If on the other hand the batter should draw four "ball" cards prior to the selection of three "strike" cards he is entitled to take his base. If on the other hand the player should draw from the "at the bat" deck a card marked "Grounder," he must then draw the uppermost card from the deck known as the "grounder" deck, for the purpose of determining to whom the ball has been hit, the cards of the "grounder" deck also bearing indicia indicative of the different players' positions. Should the card drawn from the "grounder" deck bear the word "Single" the player of course is entitled to one base, or should the card be marked "Double" he is entitled to two bases and so on. If on the other hand the card drawn from the "grounder" deck should contain the word "Error," the player would also be entitled to a single base.

As hereinabove enumerated and as clearly illustrated in the drawing the "at the bat" deck consists of a plurality of suits, or a total of seventy-seven cards containing indicia such as "Hit by pitcher," "Bunt," "Out on foul," and other indicia which cover the various plays in the national game of base ball. Should the cards be drawn from the "at the bat" deck containing the expression "Hit by pitcher," the player would be entitled to take his position on first base. Again if the player should draw from the pack a card marked "Out on foul," the player would accordingly be declared out by the player or players of the opposition. It is to be borne in mind however that the cards are drawn from the pack in the manner hereinabove mentioned by the one player until three outs have been recorded, and then the opposition or other player takes his turn in withdrawing the cards in a similar manner. In addition to retiring the supposed batters in the manner hereinabove enumerated, it is also possible to retire a member of the team at bat, after the batter has reached first base. In this instance should a runner be on first base, and the player draw from the "at the bat" deck the card marked "Out off base," or the card marked "Out stealing" the runner is accordingly declared out by the opposition.

Each of the "out off base" cards has indicia thereon indicative of the player's position. For instance should there be a man on first base, it would be necessary to draw an "out off base" card indicative of the first baseman in order to declare the runner out. On the other hand it is possible to draw from the "at the bat" deck a card marked "Wild pitch" or a card marked "Stolen base," which obviously entitles the runner to advance to the next base. The "at the bat" deck also contains a number of cards marked "Bunt," and should one of these cards be drawn with a runner on first, the player must then draw the uppermost card from the "bunt" deck to determine whether or not the batter is "safe" or "out." If the card drawn from the "bunt"

deck indicates that the batter is "safe," the runner is entitled to advance to the next base. However if the card drawn from the "bunt" deck indicates that the batter is "out" and the card from the "bunt" deck shows that the second baseman or short stop handled the ball, the player then draws one card from the "double play" deck to determine whether or not the runner was caught at second and a double play completed. Again, if with a man on first base, and with one or none out, the player draws from the "at the bat" deck a card with the word "Grounder" thereon, he then draws the uppermost card from the "grounder" deck to determine the extent of the hit, that is to say whether or not the batter singles or doubles, or whether he is out or an error had been made. If the card so drawn shows that the batter singled, the player then draws one card from the "advance" deck with a view of determining whether or not the runner on base advances one or two bases. If the card drawn from the "grounder" deck indicates that the batter "doubled," the runner accordingly advances two bases. Now should the card drawn from the "grounder" deck indicate an "out," the player draws one card from the "double play" deck to determine whether or not the runner has advanced on the play, or out, or whether or not a double play had been completed. In this connection however it is necessary that either the "second baseman" or "short stop" must handle the ball, which players' positions are indicated on the cards as shown.

Should the player draw from the "at the bat" deck a card marked "Fly," he would then draw from the "fly" deck one card to determine to whom the ball was hit, and whether or not a single, double, triple, home run, out or error had been made. Should a runner be on base he would advance consistently with the number of bases obtained on the hit, except in the case where only a single had been made by the batter, in which instance a card from the "advance" deck would be drawn to determine how many bases the runner advanced. Of course should the fly ball be caught by one of the players, which play would be indicated by drawing from the "fly" deck a card marked "Out," the player could, if desired, draw a card from the "double play" deck to determine if the runner on base, advanced a base, or if a double play had been executed. During the play of the game it is also possible to draw from the "at the bat" deck a card marked "Error," which refers the player to the "error" deck from which a card is drawn, which card informs the player to whom the ball was hit, and also entitles the supposed batter to a base.

It will be manifest from the foregoing that I have devised a means whereby the national game of base ball may be played with cards, which latter are so divided and contain such indicia to permit of every play governed by the rules of the national game of base ball to be played. The game is exceedingly interesting, and of course can be played upon any suitable support such as a table or the like. It is believed that from the foregoing description the nature and manner of playing the game will be thoroughly understood without requiring a more extended explanation and therefore the same has been omitted.

What is claimed is:—

1. A base ball game comprising a plurality of decks of cards, including a main deck and a number of auxiliary decks, the cards of the main deck containing indicia indicative of the initial step of certain plays of the game, while the cards of the auxiliary decks contain indicia to complete said plays, and the indicia on the cards of the main deck being related to the indicia on the cards of the auxiliary decks to determine from which of said decks a card must be played subsequent to the lead from the main deck.

2. A base ball game comprising a plurality of decks of cards, including a main deck and a number of auxiliary decks, the cards of the main deck having indicia indicative of the initial step of certain plays of the game, while the cards of the auxiliary decks contain indicia to complete said plays when used in certain combinations with the card from the main deck, the indicia on the cards of all the decks being related to determine from which deck the next card must be played to complete a play subsequent to the playing of a card from any deck.

In testimony whereof I affix my signature in presence of two witnesses.

JOHN H. McCLELLAND.

Witnesses:
 F. J. FUNKE,
 E. B. DAHL.